United States Patent
Allouche et al.

(10) Patent No.: US 11,130,899 B2
(45) Date of Patent: Sep. 28, 2021

(54) COMPOSITIONS AND METHODS FOR WELL CEMENTING

(71) Applicant: Schlumberger Technology Corporation, Sugar Land, TX (US)

(72) Inventors: Mickael Allouche, Clamart (FR); Sebastien Catheline, Clamart (FR); Alice Chougnet-Sirapian, Elancourt (FR); Nicolas Droger, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/319,013

(22) PCT Filed: Jun. 16, 2015

(86) PCT No.: PCT/US2015/035919
§ 371 (c)(1),
(2) Date: Dec. 15, 2016

(87) PCT Pub. No.: WO2015/195596
PCT Pub. Date: Dec. 23, 2015

(65) Prior Publication Data
US 2017/0121587 A1    May 4, 2017

(30) Foreign Application Priority Data
Jun. 18, 2014 (EP) .................................... 14305938

(51) Int. Cl.
*C09K 8/467* (2006.01)
*C04B 28/04* (2006.01)
(Continued)

(52) U.S. Cl.
CPC ............ *C09K 8/467* (2013.01); *C04B 22/064* (2013.01); *C04B 22/066* (2013.01);
(Continued)

(58) Field of Classification Search
None
See application file for complete search history.

(56) References Cited

U.S. PATENT DOCUMENTS

| 1,265,655 A | 5/1918 | Henderson et al. |
| 1,344,461 A | 6/1920 | Thomas et al. |

(Continued)

FOREIGN PATENT DOCUMENTS

| CN | 104692694 A | 6/2015 |
| DE | 3704783 A1 | 8/1988 |

(Continued)

OTHER PUBLICATIONS

Brufatto et al., "From Mud to Cement—Building Gas Wells": Oilfield Review Autumn 2003, p. 62-p. 76.
(Continued)

*Primary Examiner* — Charles R Nold

(57) ABSTRACT

Methods for cementing a subterranean well and maintaining zonal isolation involve preparing a cement slurry that contains water, an inorganic cement and an expanding agent. The slurry is placed in the annular region between casing and the formation or between two casing strings. After the cement sets, the expanding agent reacts and causes the set cement to be in a state of compression within the annular region. The casing dimensions may fluctuate in response to a temperature change, a pressure change, a mechanical disturbance resulting from a well intervention, or mud contamination or a combination thereof. The expanding agent may further react and maintain a state of compression within the annular region. The state of compression in the annular region may be monitored by acoustic impedance measurements.

18 Claims, 10 Drawing Sheets

(51) Int. Cl.

| | | |
|---|---|---|
| *E21B 47/14* | (2006.01) | |
| *E21B 33/14* | (2006.01) | |
| *C04B 28/14* | (2006.01) | |
| *C04B 28/06* | (2006.01) | |
| *C04B 28/18* | (2006.01) | |
| *C04B 28/02* | (2006.01) | |
| *C04B 28/34* | (2006.01) | |
| *C04B 28/00* | (2006.01) | |
| *C04B 28/32* | (2006.01) | |
| *E21B 47/005* | (2012.01) | |
| *E21B 47/007* | (2012.01) | |
| *E21B 47/107* | (2012.01) | |
| *C04B 22/06* | (2006.01) | |
| *C04B 103/56* | (2006.01) | |

(52) U.S. Cl.
CPC ............ *C04B 28/006* (2013.01); *C04B 28/02* (2013.01); *C04B 28/04* (2013.01); *C04B 28/06* (2013.01); *C04B 28/145* (2013.01); *C04B 28/18* (2013.01); *C04B 28/32* (2013.01); *C04B 28/34* (2013.01); *E21B 33/14* (2013.01); *E21B 47/005* (2020.05); *E21B 47/007* (2020.05); *E21B 47/107* (2020.05); *E21B 47/14* (2013.01); *C04B 2103/58* (2013.01); *Y02P 40/10* (2015.11); *Y02W 30/91* (2015.05)

(56) References Cited

U.S. PATENT DOCUMENTS

| | | | |
|---|---|---|---|
| 1,394,273 A | 10/1921 | Carrier et al. | |
| 1,852,696 A | 4/1932 | Chaffee et al. | |
| 2,329,148 A | 9/1943 | van Leeuwen | |
| 2,465,278 A | 3/1949 | Schenker et al. | |
| 3,221,548 A | 12/1965 | Wilson et al. | |
| 3,265,151 A | 8/1966 | Anderson et al. | |
| 3,303,461 A | 2/1967 | Edwards et al. | |
| 3,308,426 A | 3/1967 | Wilson et al. | |
| 3,691,518 A | 9/1972 | Schuster | |
| 3,696,884 A | 10/1972 | Lafleur | |
| 3,811,529 A | 5/1974 | Crawford | |
| 3,884,710 A | 5/1975 | Allen et al. | |
| 3,952,741 A | 4/1976 | Baker | |
| 4,002,483 A | 1/1977 | Daugherty et al. | |
| 4,205,994 A | 6/1980 | Moyer, Jr. et al. | |
| 4,255,798 A | 3/1981 | Havira | |
| 4,328,038 A | 5/1982 | Briggs | |
| 4,332,619 A | 6/1982 | Gandy et al. | |
| 4,391,329 A * | 7/1983 | Gallus ...................... C04B 28/02 | |
| | | 106/671 | |
| 4,419,136 A | 12/1983 | Rice | |
| 4,495,606 A | 1/1985 | Smith | |
| 4,607,698 A | 8/1986 | Wood | |
| 4,741,401 A | 5/1988 | Walles et al. | |
| 4,757,479 A | 7/1988 | Masson et al. | |
| 4,797,159 A | 1/1989 | Spangle | |
| 4,871,179 A | 10/1989 | Bell et al. | |
| 4,893,285 A | 1/1990 | Masson et al. | |
| 4,986,354 A | 1/1991 | Cantu et al. | |
| 5,118,527 A | 6/1992 | Wilson | |
| 5,275,654 A | 1/1994 | Cowan | |
| 5,650,004 A | 7/1997 | Yon | |
| 5,741,357 A | 4/1998 | Sheikh | |
| 5,942,031 A | 8/1999 | Cheung | |
| 6,105,673 A | 8/2000 | Harris et al. | |
| 6,209,646 B1 | 4/2001 | Reddy et al. | |
| 6,675,895 B1 * | 1/2004 | Shehab .................. E21B 33/13 | |
| | | 166/250.14 | |
| 6,743,470 B2 | 6/2004 | Pellerite et al. | |
| 6,909,969 B2 | 6/2005 | Calvert et al. | |
| 6,966,376 B2 | 11/2005 | Vaeth et al. | |
| 7,150,317 B2 | 12/2006 | Barolak et al. | |
| 7,156,174 B2 | 1/2007 | Roddy et al. | |
| 7,494,544 B2 | 2/2009 | Go Boncan | |
| 7,525,872 B2 | 4/2009 | Tang et al. | |
| 7,663,969 B2 | 2/2010 | Tang et al. | |
| 7,670,627 B2 | 3/2010 | Shefer et al. | |
| 7,712,530 B1 | 5/2010 | Edgley et al. | |
| 7,722,954 B2 | 5/2010 | Santra et al. | |
| 7,773,454 B2 | 8/2010 | Barolak et al. | |
| 7,988,782 B2 | 8/2011 | Rice et al. | |
| 8,157,008 B2 | 4/2012 | Lilley | |
| 8,273,426 B1 | 9/2012 | Laramay et al. | |
| 8,336,620 B2 | 12/2012 | Williams et al. | |
| 2001/0026863 A1 | 10/2001 | Hirano et al. | |
| 2002/0037306 A1 | 3/2002 | Van Koppenhagen et al. | |
| 2002/0166698 A1 | 11/2002 | Beato et al. | |
| 2003/0156494 A1 | 8/2003 | McDaniel et al. | |
| 2003/0216866 A1 | 11/2003 | Edward Calvert et al. | |
| 2004/0109894 A1 | 6/2004 | Shefer et al. | |
| 2004/0147406 A1 | 7/2004 | Go Boncan | |
| 2004/0168801 A1 | 9/2004 | Reddy et al. | |
| 2004/0234597 A1 | 11/2004 | Shefer et al. | |
| 2005/0123596 A1 | 6/2005 | Kohane et al. | |
| 2005/0167107 A1 * | 8/2005 | Roddy .................. C04B 20/1029 | |
| | | 166/295 | |
| 2005/0190648 A1 | 9/2005 | Tang et al. | |
| 2005/0205248 A1 | 9/2005 | Barolak et al. | |
| 2005/0234649 A1 | 10/2005 | Calvert et al. | |
| 2006/0162930 A1 | 7/2006 | Gronsveld et al. | |
| 2006/0198243 A1 | 9/2006 | Tang et al. | |
| 2006/0269752 A1 | 11/2006 | Holland et al. | |
| 2007/0206439 A1 | 9/2007 | Barolak et al. | |
| 2007/0219758 A1 | 9/2007 | Bloomfield | |
| 2008/0073082 A1 * | 3/2008 | Thiercelin ............. E21B 33/138 | |
| | | 166/280.1 | |
| 2008/0131709 A1 | 6/2008 | Hanson et al. | |
| 2010/0126718 A1 | 5/2010 | Lilley | |
| 2011/0048701 A1 | 3/2011 | Williams et al. | |
| 2011/0240302 A1 | 10/2011 | Coludrovich | |
| 2012/0018154 A1 | 1/2012 | James | |
| 2012/0080184 A1 * | 4/2012 | Jahangir ............. E21B 47/0005 | |
| | | 166/254.2 | |
| 2012/0175118 A1 | 7/2012 | Khatri et al. | |
| 2012/0188236 A1 | 7/2012 | Legendre et al. | |
| 2012/0247774 A1 | 10/2012 | Li et al. | |
| 2013/0065755 A1 | 3/2013 | Taylor et al. | |
| 2013/0161006 A1 * | 6/2013 | Robisson ............. E21B 33/1208 | |
| | | 166/285 | |
| 2014/0052376 A1 * | 2/2014 | Guo ....................... E21B 47/00 | |
| | | 702/11 | |
| 2014/0102704 A1 | 4/2014 | Patil et al. | |
| 2014/0121136 A1 | 5/2014 | Mirakyan et al. | |
| 2014/0144634 A1 * | 5/2014 | Nguyen ................. E21B 43/261 | |
| | | 166/281 | |
| 2015/0107493 A1 | 4/2015 | Rice | |
| 2016/0032706 A1 | 2/2016 | Bornaz et al. | |
| 2017/0121587 A1 | 5/2017 | Allouche et al. | |
| 2017/0349805 A1 | 12/2017 | Muss et al. | |
| 2019/0161669 A1 | 5/2019 | Droger et al. | |

FOREIGN PATENT DOCUMENTS

| | | | | |
|---|---|---|---|---|
| DE | 19801610 | | 7/1999 | |
| EP | 0073335 A1 | | 3/1983 | |
| EP | 0098778 A2 | | 1/1984 | |
| EP | 0254342 A2 * | | 1/1988 | ............. C04B 2/102 |
| EP | 0098778 B1 | | 3/1989 | |
| EP | 1275983 A2 | | 1/2003 | |
| EP | 1464959 A1 | | 10/2004 | |
| EP | 1698912 A2 | | 9/2006 | |
| EP | 2113546 A1 | | 11/2009 | |
| EP | 2169027 A1 | | 3/2010 | |
| EP | 2246408 A2 | | 11/2010 | |
| EP | 2615151 A1 | | 7/2013 | |
| EP | 2676944 A1 | | 12/2013 | |
| JP | S5841756 A | | 3/1983 | |
| JP | 2009263164 A | | 11/2009 | |
| RU | 2452758 C1 | | 6/2012 | |
| WO | WO1988004729 | | 6/1988 | |
| WO | 9322537 A1 | | 11/1993 | |

(56) References Cited

FOREIGN PATENT DOCUMENTS

| WO | WO1997030246 | | 8/1997 |
|----|----|----|----|
| WO | WO2002087959 | A2 | 11/2002 |
| WO | 03048526 | A2 | 6/2003 |
| WO | 03106809 | A1 | 12/2003 |
| WO | WO2004088302 | A1 | 10/2004 |
| WO | 2005030174 | A1 | 4/2005 |
| WO | 2005061846 | A1 | 7/2005 |
| WO | WO2005089458 | A2 | 9/2005 |
| WO | 2007041420 | A2 | 4/2007 |
| WO | 2008034461 | A1 | 3/2008 |
| WO | WO2008047107 | A1 | 4/2008 |
| WO | 2010140032 | A2 | 12/2010 |
| WO | WO2010141037 | A1 | 12/2010 |
| WO | WO2011126667 | A1 | 10/2011 |
| WO | WO2012027334 | A1 | 10/2011 |
| WO | WO2012177262 | A1 | 10/2011 |
| WO | 2013023949 | A2 | 2/2013 |
| WO | 2015047301 | A1 | 4/2015 |
| WO | 2015195596 | A1 | 12/2015 |
| WO | 2017137788 | A1 | 8/2017 |
| WO | 2017137789 | A1 | 8/2017 |

OTHER PUBLICATIONS

Zhen—New Cementing Technologies Successfully Solved the problems in shallow Gas, Low Temperature and Easy Leakage Formations, SPE131810—CPS/SPE International Oil & Gas Conference and Exhibition in China held in Beijing, China, Jun. 8-10, 2010 (17 pages).

Moroni et al., Achieving Long-tern isolation for thin gas zones in the Adriatic sea region, SPE92193—SPE Western Regional Meeting held in Irvine, CA, U.S.A., Mar. 30-Apr. 1, 2005 (11 pages).

Robert Van Kuijk et al: "A Novel Ultrasonic Cased-Hole Imager for Enhanced Cement Evaluation", Proceedings of International Petroleum Technology Conference, Jan. 1, 2005, (14 pages).

International Search Report and Written Opinion issued in the related PCT application PCT/US2015/035919, dated Sep. 24, 2015 (9 pages).

Boukhelifa et al., Evaluation of Cement Systems for Oil and Gas Wells Zonal Isolation in a Full-Scale Annular Geometry, SPE 87195—IADC/SPE Drilling Conference held in Dallas, Texas, U.S.A., Mar. 2-4, 2004 (15 pages).

Belrute et al.,—Attenuation of Casing Cemented with Conventional and Expanding Cements Across Heavy-Oil and Sandstone Formations, SPE18027—SPE Drilling Engineering, Sep. 1992 (7 pages).

Jin et al., "Preparation, characterization and application of octadecyl modified magnesium oxide microspheres", Analytica Chemica Acta, vol. 693, pp. 54-61, 2011.

Chemical Abstracts, Chemical Abstracts Service (CAS), US, Mar. 25, 1991, XP000193363, ISSN: 0009-2258, abstract, p. 353.

International Search Report issued in International Patent Application No. PCT/IB2016/000261 dated Jan. 12, 2016; 7 pages.

Written Opinion issued in International Patent Application No. PCT/IB2016/000261 dated Jan. 12, 2016; 12 pages.

Wicks et al., "Modeling and Field Trials of the Effective Tractoring Force of Axial Vibration Tools", SPE 170327, SPE Deepwater Drilling and Completions Conference, Sep. 10-11, 2014, 11 pages.

Musso et al., "Expanding Cement Compositions", U.S. Appl. No. 14/307,430 (unpublished) filed on Jun. 17, 2014; 20 pages.

American Concrete Institute 223R-10 Guide for the Use of Shrinkage-Compensating Concrete, 2010.

Van Kuijk et al., "A Novel Ultrasonic Cased-Hole Imager for Enhanced Cement Evaluation", IPTC 10546, Proceedings of International Petroleum Technology Conference, Jan. 1, 2005, 14 pages.

Office Action issued in related U.S. Appl. No. 16/091,778 dated Sep. 3, 2019, 10 pages.

Office Action issued in related U.S. Appl. No. 16/077,174 dated Mar. 8, 2021; 9 pages.

\* cited by examiner

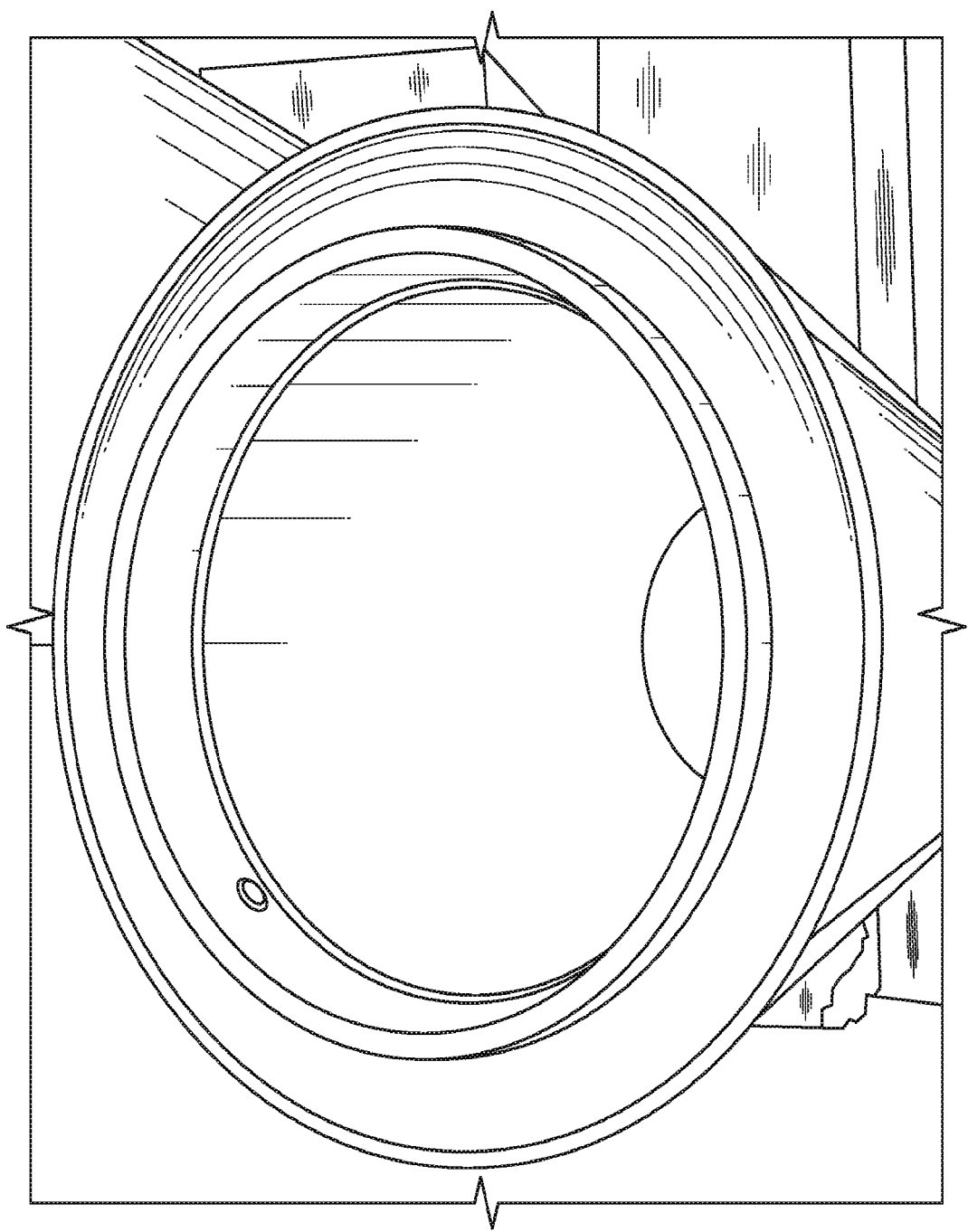

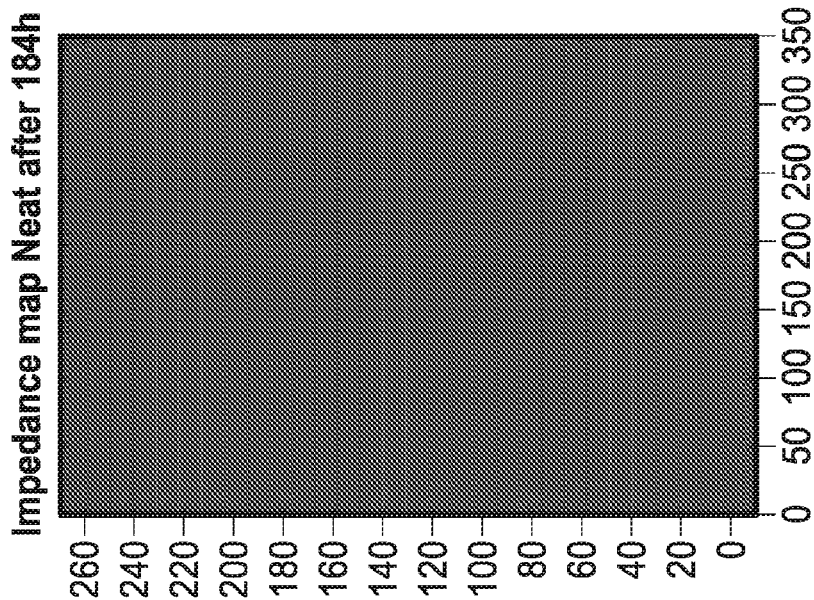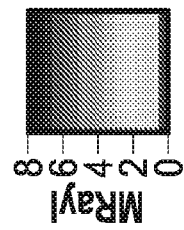
FIG. 10B
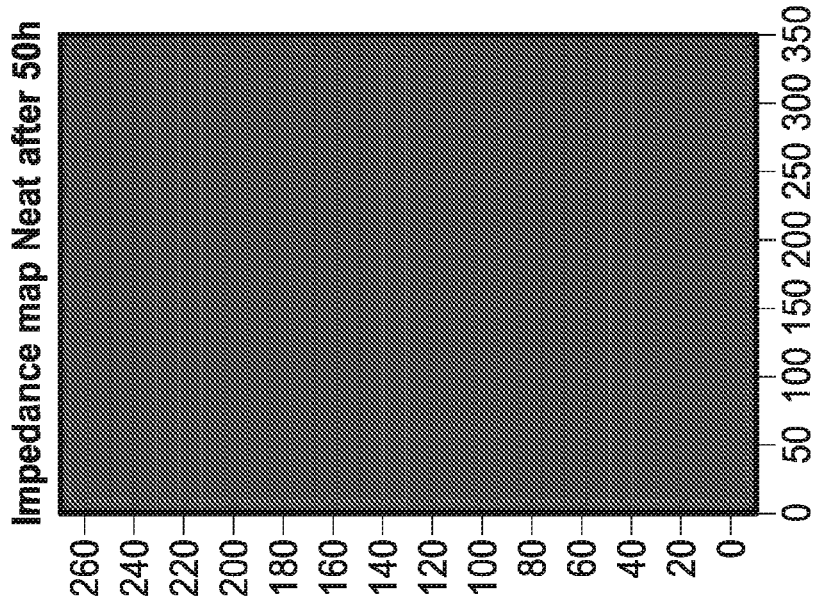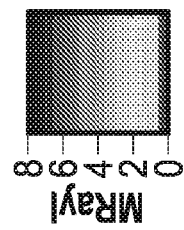
FIG. 10A

COMPOSITIONS AND METHODS FOR WELL CEMENTING

CROSS-REFERENCE TO RELATED APPLICATION

This application claims benefit of EP Patent App. Ser. No. 14305938.4 filed Jun. 18, 2014, which is herein incorporated by reference in its entirety.

BACKGROUND

The statements in this section merely provide background information related to the present disclosure and may not constitute prior art.

The present disclosure broadly relates to systems and methods for cementing subterranean wells and maintaining zonal isolation therein.

Good bonding between set cement and casing and between set cement and the formation is essential for effective zonal isolation. Poor bonding limits production and reduces the effectiveness of stimulation treatments. Communication between zones can be caused by inadequate mud removal, poor cement/formation bonding, expansion and contraction of the casing resulting from internal pressure variations or thermal stresses, and cement contamination by drilling or formation fluids. Under such circumstances a small gap or microannulus may form at the cement/casing or the cement/formation interface or both.

Cement systems that expand slightly after setting may provide a means for sealing microannuli and improving primary cementing results. The improved bonding may be the result of mechanical resistance or tightening of the cement against the pipe and formation.

Portland cement manufacturers generally limit the amount of certain alkaline impurities to avoid expansion of the set cement, a condition called "unsoundness." In an unrestrained environment such as a road or building, expansion of the set cement can result in cracking and failure. In a wellbore environment, however, the cement is restrained by the casing and, when competent, the formation. Consequently, once the cement has expanded to eliminate void spaces, further expansion reduces internal porosity. Generally, expanding cements should be more flexible than the formation; otherwise, the cement may not expand toward the casing, risking the formation of a microannulus.

The presence or absence of cement in the annulus between casing and the formation (or between two casing strings) may be detected by acoustic logging. Among the tools currently available, sonic or ultrasonic imagers are commonly used. However, when a gas-filled microannulus exists, these tools are unable to detect the presence of cement behind. A common practice is to run logs while applying pressure inside the casing, thus causing the casing to expand and contact the cement sheath.

SUMMARY

The present disclosure reveals methods for pre-stressing the cement sheath, thereby allowing the cement to maintain an acoustic coupling with the casing despite pressure and temperature variations, mechanical perturbations arising from well intervention operations and deposits of drilling fluid or spacer left on the casing surface.

In an aspect, embodiments relate to methods for cementing a subterranean well having a borehole. A cement slurry is prepared that comprises water, an inorganic cement and an expanding agent. The slurry is then placed in an annular region between a tubular body and a borehole wall, or between two tubular bodies. The slurry is allowed to harden and form a set cement. After setting, the expanding agent is allowed to react and cause the set cement to be in a state of compression within the annular region.

In a further aspect, embodiments relate to methods for maintaining zonal isolation in a wellbore. A cement slurry is prepared that comprises water, an inorganic cement and an expanding agent. The slurry is then placed in an annular region between a tubular body and a borehole wall, or between two tubular bodies. The slurry is allowed to harden and form a set cement. The dimensions of the tubular body are allowed to fluctuate in response to a temperature change, a pressure change, or a mechanical disturbance resulting from a well intervention or a combination thereof. The expanding agent is then allowed to react and cause the set cement to be in a state of compression within the annular region.

In yet a further aspect, embodiments relate to methods for determining the presence of cement behind a tubular body in a subterranean well. A cement slurry is prepared that comprises water, an inorganic cement and an expanding agent. The slurry is then placed in an annular region between a tubular body and a borehole wall, or between two tubular bodies. The slurry is allowed to harden and form a set cement. After setting, the expanding agent is allowed to react and cause the set cement to be in a state of compression within the annular region. An acoustic logging tool is then introduced into the tubular body. The tool measures the acoustic impedance, an amplitude, an attenuation or a bond index or a combination thereof, the measurements taken azimuthally, longitudinally or both along the tubular body.

BRIEF DESCRIPTION OF THE DRAWINGS

FIG. 4 is a photograph of a laboratory apparatus for measuring the acoustic impedance of cements in an annulus.

FIGS. 10A and 10B show the acoustic impedance measurements of neat cement systems after curing in the laboratory apparatus of FIG. 4.

DETAILED DESCRIPTION

Figure 1:
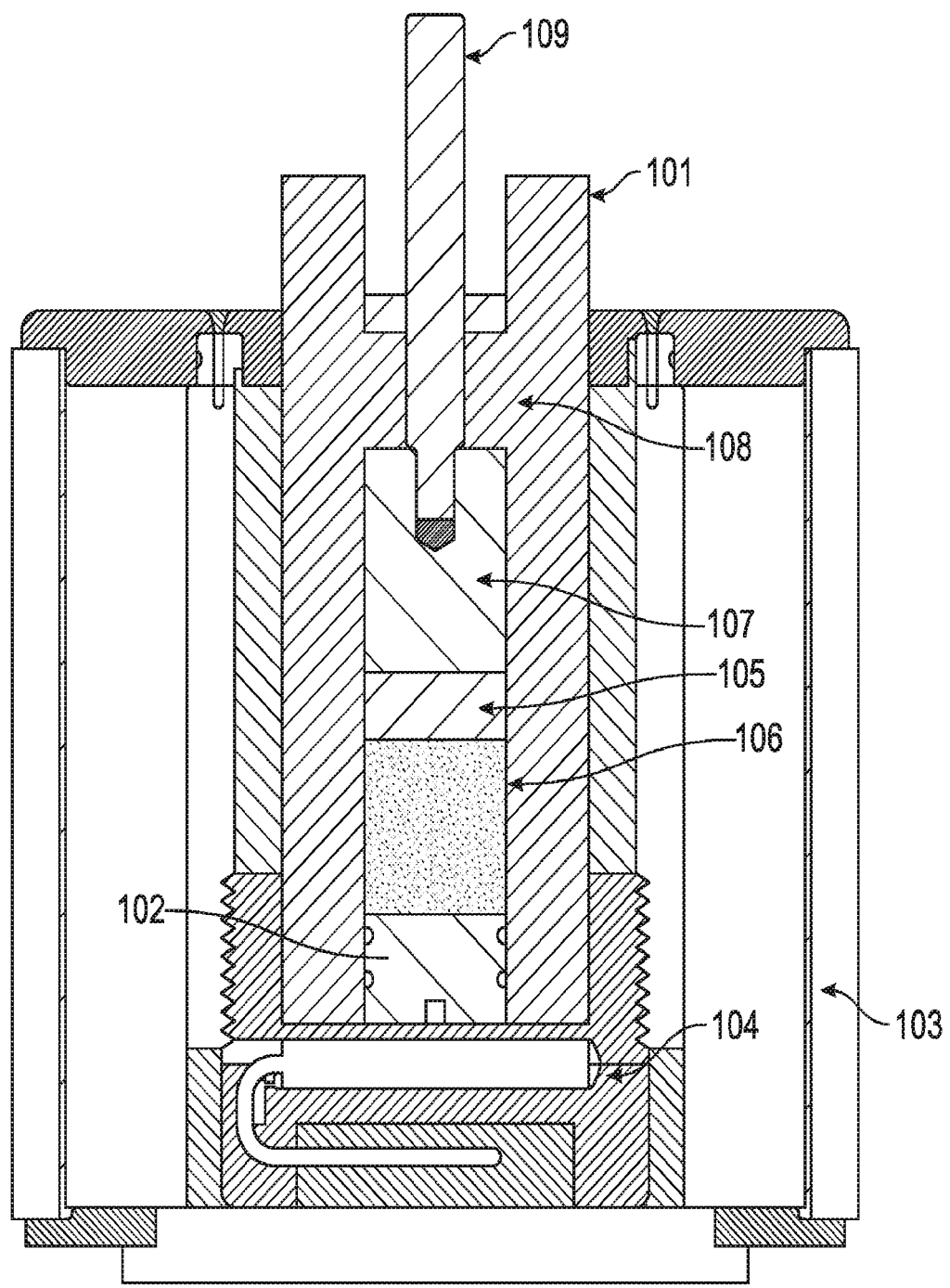
FIG. 1 shows a diagram of an apparatus for measuring cement expansion and prestress development.

The present disclosure will be described in terms of treatment of vertical wells, but is equally applicable to wells of any orientation. The disclosure will be described for hydrocarbon-production wells, but it is to be understood that the disclosed methods can be used for wells for the production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the Applicants appreciate and understand that any and all data points within the range are to be considered to have been specified, and that the Applicants have possession of the entire range and all points within the range.

In this disclosure, the tubular body may be any string of tubulars that may be run into the wellbore and at least partially cemented in place. Examples include casing, liner, solid expandable tubular, production tubing and drill pipe.

In an aspect, embodiments relate to methods for cementing a subterranean well having a borehole. A cement slurry is prepared that comprises water, an inorganic cement and an expanding agent. The slurry is then placed in an annular region between a tubular body and a borehole wall, or between two tubular bodies. The slurry is allowed to harden and form a set cement. After setting, the expanding agent is allowed to react and cause the set cement to be in a state of compression within the annular region.

The method may further comprise allowing the dimensions of the tubular body to fluctuate in response to a temperature change, a pressure change, or a mechanical disturbance resulting from a well intervention or a combination thereof. The method may also further comprise allowing the set cement to expand and maintain the state of compression after the dimensional fluctuation of the tubular body.

In a further aspect, embodiments relate to methods for maintaining zonal isolation in a wellbore. A cement slurry is prepared that comprises water, an inorganic cement and an expanding agent. The slurry is then placed in an annular region between a tubular body and a borehole wall, or between two tubular bodies. The slurry is allowed to harden and form a set cement. The dimensions of the tubular body are allowed to fluctuate in response to a temperature change, a pressure change, or a mechanical disturbance resulting from a well intervention or a combination thereof. The expanding agent is then allowed to react and cause the set cement to be in a state of compression within the annular region.

In yet a further aspect, embodiments relate to methods for determining the presence of cement behind a tubular body in a subterranean well. A cement slurry is prepared that comprises water, an inorganic cement and an expanding agent. The slurry is then placed in an annular region between a tubular body and a borehole wall, or between two tubular bodies. The slurry is allowed to harden and form a set cement. After setting, the expanding agent is allowed to react and cause the set cement to be in a state of compression within the annular region. An acoustic logging tool is then introduced into the tubular body. The tool measures the acoustic impedance, an amplitude, an attenuation or a bond index or a combination thereof, the measurements taken azimuthally, longitudinally or both along the tubular body.

For all aspects, the viscosity of the cement slurry during placement may be lower than 1000 cP at a shear rate of 100 $s^{-1}$. The inorganic cement may comprise portland cement, calcium aluminate cement, fly ash, blast furnace slag, lime/silica blends, zeolites, magnesium oxychloride, geopolymers or chemically bonded phosphate ceramics or combinations thereof.

For all aspects, the expanding agent may comprise calcium oxide, magnesium oxide or calcium sulfate hemihydrate or combinations thereof. The expanding agent may be present at a concentration between 5% and 25% by weight of cement.

For all aspects, the cement expansion may be delayed. The expanding agent may be encapsulated or held as an internal phase of an emulsion.

For all aspects the cement slurry may further comprise silica, diatomaceous earth, gilsonite, hematite, ilmenite, manganese tetraoxide, barite, glass or ceramic microspheres or combinations thereof.

EXAMPLES

The following examples are provided to more fully illustrate the disclosure. These examples are not intended to limit the scope of the disclosure in any way.

All of the experiments presented here were performed with Class G oilwell cement. For the confined expansion measurements described in Example 1, the expanding agent was hard-burned magnesium oxide (MgO). The MgO was present at concentrations of 5%, 14%, and 25% by weight of cement (BWOC). The 5% concentration is at the upper end of what is typically used in the field. Slurries were prepared at a water-to-solids ratio of 0.41, and mixed by hand or with a low-speed paddle mixer. No other additives were used. For confined expansion testing, approximately 50 g of slurry was used. The expansion tests were conducted at 85° C. and ambient pressure.

For the logging experiments described in Example 2, Class G cement was used, and the expanding agent was a mixture of hard-burned CaO and hard-burned MgO. The CaO/MgO weight ratio was 1.43. CaO and MgO hydrate in similar ways to generate expansion, but CaO tends to be much more reactive at a given temperature than MgO. These experiments were conducted with a neat cement slurry or one with 12% BWOC of expanding agent. In both cases the water-to-solids ratio was 0.41. Small amounts of dispersant, anti-settling agent, and antifoaming agent were also added to generate a stable slurry. Mixing was performed in a Waring high-speed blender with a capacity of 4 L. Because the logging test requires about 7 L of slurry, two batches were prepared for each test and combined.

Example 1

To measure the effects of expanding agents under confined conditions, a temperature-controlled confinement cell was designed and built (FIG. 1). Radial confinement is provided by a hollow steel cylinder 101 with ID=2.86 cm (1.125 in.) and OD=7.62 cm (3 in.). The cylinder was sealed at the bottom with a removable metallic plug 102 that screws into the bottom and seals with two O-rings. This cell was designed such that the axial confinement from the top is provided by a piston 107 that slides easily inside the steel cylinder and is connected by a rod 109 to a programmable mechanical testing machine with a 5-kN load cell.

The steel cylinder is screwed inside a heating/insulator chamber 103 where a glycol bath is heated up with a resistance heater 104. Tests can be performed at temperatures between room temperature and about 95° C. The upper limit is defined by the inability to prevent water escaping from the cement as vapor, since the device is not pressure-tight. Two thermocouples are placed near the heater and near the cement sample. They are connected to the heater power supply box and are used to maintain a fixed set-point temperature.

Two general modes of operation can be used with the expansion cell: fixed displacement of the piston (in which case the compressive load is measured) and fixed load applied to the piston (in which case the displacement of the piston is measured). The experiments reported here were conducted in fixed displacement mode.

To simulate hydration of cement placed against a permeable formation containing water, a porous ceramic disk 105 that was saturated with water was placed on top of the cement sample 106, with a layer of filter paper between to keep the disk clean. The piston was then inserted into the cylinder until it made contact with the porous disk. Additional water 108 was poured on top of the piston, and then finally a layer of high-boiling-point silicon oil was added to prevent evaporation of the water. Holes in the piston allowed water access between the sample and reservoir. As the cement and expanding agent reacted, volume lost to chemical shrinkage was replaced by external water flowing into the slurry from above, keeping the pores of the sample saturated. To simulate hydration of cement placed against a tight formation that supplies no water to the cement, the piston was placed directly in contact with the cement and a thick layer of lubricant was used to prevent water evaporation from the specimen. In this case, chemical shrinkage desaturated the pore system, causing some shrinkage that may have been compensated by the expanding agent.

Figure 2A:
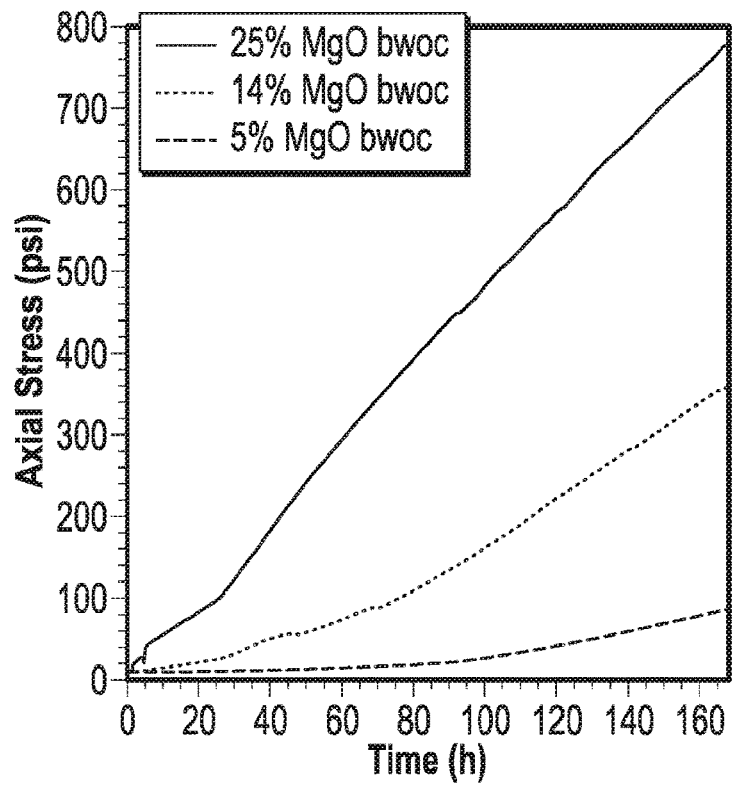
FIGS. 2A and 2B show the results of confined cement expansion experiments.

FIG. 2 shows the compressive stress in cement/MgO blends as they hydrate at 85° C., calculated by dividing the force applied by the piston to maintain a fixed displacement by the area of the specimen. In FIG. 2A, results are shown for three different blends containing 5%, 15%, and 25% MgO by weight of cement (BWOC), with water available through a porous ceramic disk above the specimen. This represents the condition of cemented annulus placed against a stiff, water-filled rock formation. Note that 25% MgO BWOC corresponds to a blend of 80% cement/20% MgO.

After 1 week, compressive stresses ranging from about 90-750 psi (0.6-5 MPa) had developed in the samples, with the stress level roughly proportional to the MgO concentration. The kinetics of load development did not follow the kinetics of MgO hydration. Whereas the hydration of MgO exhibited a declining rate that nearly reached a plateau after a several days, the load development was still increasing strongly after one week.

Figure 2B:
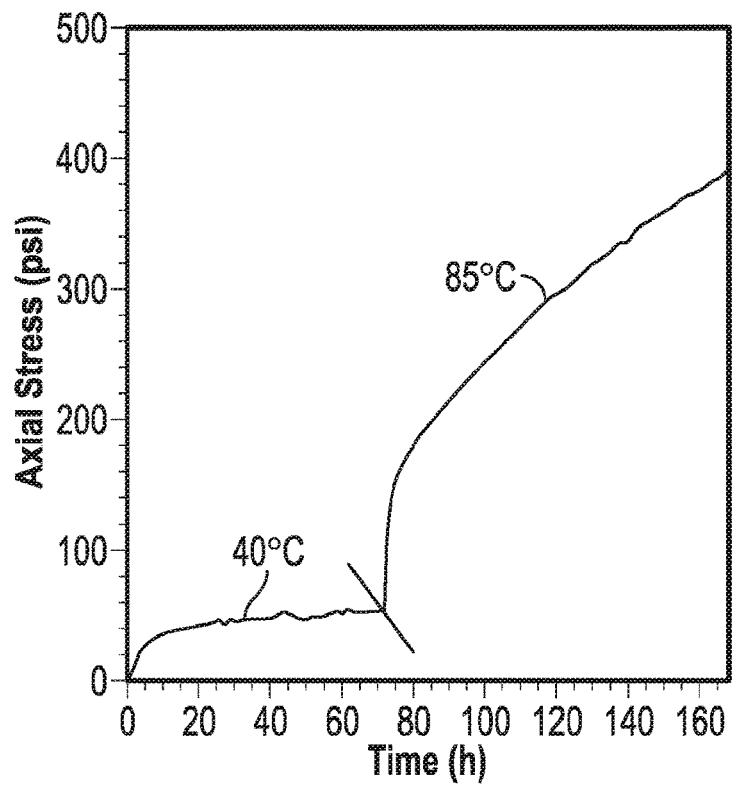

One confinement test was also performed with 14% BWOC of the more reactive expanding agent consisting of a blend of hard-burned CaO and MgO (FIG. 2B). For this test, the temperature was held at 40° C. for the first 72 h, and then increased to 85° C. thereafter. The behavior shown in FIG. 2B can be related to the presence of both MgO and CaO in the expanding agent. The CaO is much more reactive, so it provides early expansion even at 40° C. and then becomes completely hydrated after about 24 h, whereas the MgO is nearly inert at 40° C. When the temperature is increased to 85° C. the MgO begins to react, giving strong expansion over the next week and beyond.

Figure 3A:
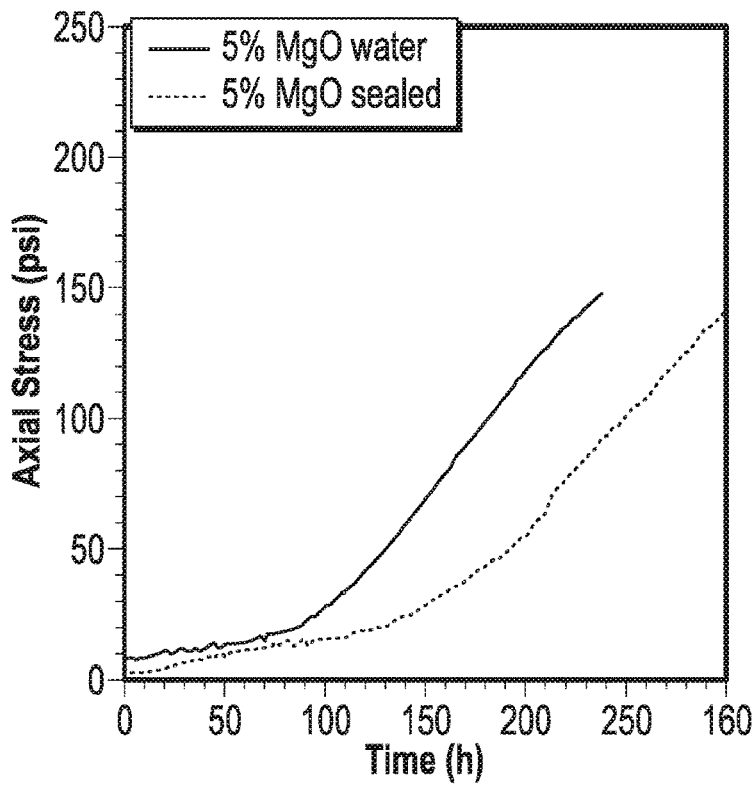
FIGS. 3A and 3B show the results of expansion experiments for cements with a constant supply of external water, and cements in a sealed environment.
Figure 3B:
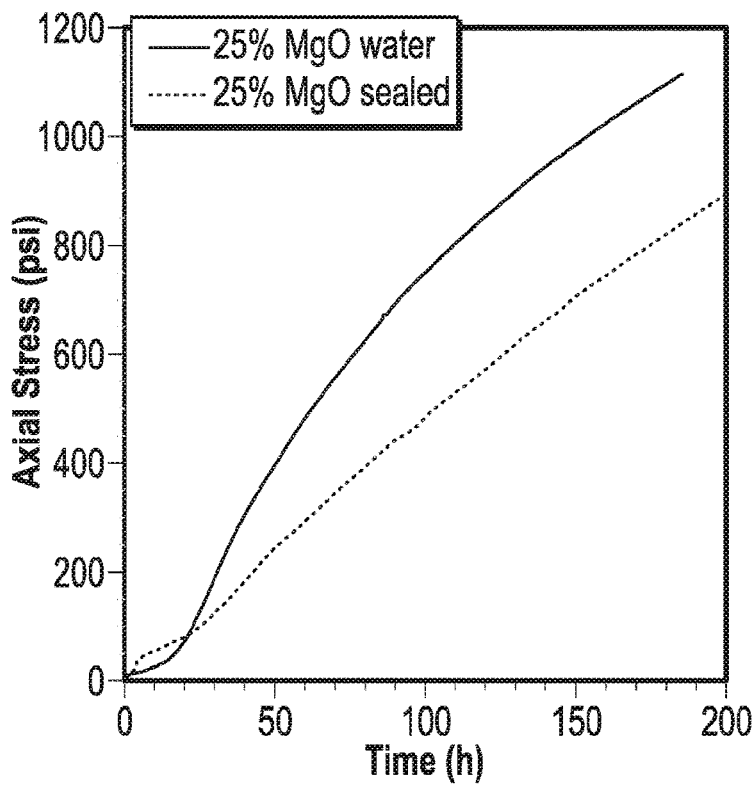

The effect of water availability on the development of expansive stress within the cement was also explored, as shown in FIGS. 3A and 3B. Under sealed conditions, chemical shrinkage caused by hydration of both the cement and expanding agent will cause the pores to become desaturated, resulting in autogeneous shrinkage. Such a condition will occur for cement placed against a tight formation such as a shale, or for cementing between casings. FIG. 3A shows the expansion comparison for cements containing 5% BWOC MgO, one exposed to external water and the other sealed. The sealed cement exhibited a delay in the expansion, after which the kinetics of load development were similar to that of the cement exposed to water, such that the stress curves were parallel. This can be explained simply by a superposition of the expansion caused by MgO hydration and the autogeneous shrinkage at early times with sealed curing.

The same comparison for 25% bwoc MgO (FIG. 3B) shows a different behavior, in that the axial expansion stress was higher with the sealed curing condition. This was unexpected due to the expected autogeneous shrinkage as noted above. Considering the kinetics of the shrinkage and expansion provides some insight. During the first 20 h of hydration, when most autogeneous shrinkage occurs, the sealed cement indeed gives less expansion as expected. At later times, however, the expansion is greater. This suggests that the desaturation of the pore system has a positive effect on the expansion. While the reason for this is not clear, and Applicant does not wish to be held to any theory, it may be a chemical effect that relates to the amount of crystallization pressure that is generated between the $Mg(OH)_2$ crystals and the cement paste matrix. Overall, the results shown in FIGS. 3A and 3B indicate that expansive stresses can be generated under both saturated and sealed curing conditions, although expansion may be delayed in the latter case.

Example 2

An apparatus was built to study the acoustic response of cement systems or additives in different controlled configurations in an annular geometry typical of a wellbore (FIG. 4). The apparatus consists of an inner steel casing with a diameter of 7 in. (178 mm), and an outer steel casing with a diameter of 9⅝ in. (244 mm), and height of about 370 mm. For logging purposes, the inner casing is filled with water. The temperature of the cement annulus can be controlled by use of a heating jacket around the outside of the outer casing, along with a resistance heater submerged in the inner casing.

A laboratory version of an Ultrasonic Imager Tool (USIT), available from Schlumberger, may be placed inside the inner casing. This tool consists of a piezoelectric transducer mounted on a control arm that can move the transducer both axially and azimuthally. The transducer operates between 250-750 kHz and is designed for use at ambient pressure. With this setup, the acoustic impedance of the annulus at different locations can be measured, and an impedance map of the entire annulus can be generated. High impedance indicates that cement is well bonded to the inner casing, while low impedance values indicate poor bonding or the presence of a microannulus. This logging setup has a vertical resolution of about 25 mm and an azimuthal resolution of approximately 5°.

After preparing a slurry as described earlier, the slurry was pumped slowly into the annulus from below. A layer of silicone oil was poured on top of the slurry to prevent drying.

No external water was provided to the cement. Immediately after placement of the cement slurry in the annulus, the inner casing was pressurized hydraulically to 3000 psi [20.7 MPa] using a pressure sleeve. The purpose of this step was to allow a drop in casing pressure to be simulated at later times after the cement has set, by removing the hydraulic pressure. Such a step will often cause the cement to debond from the casing. Because the logging tool and pressure sleeve could not be inside the casing at the same time, logging of the annulus was begun only after the pressure sleeve was removed.

Figure 5A:
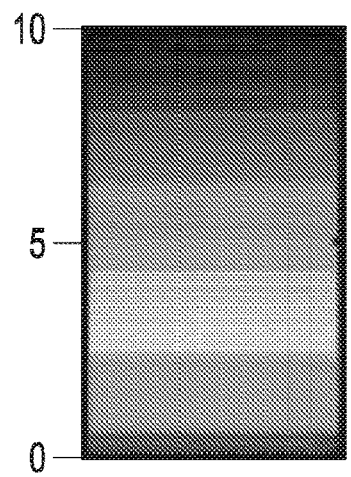
FIGS. 5A and 5B show an acoustic impedance scale and an impedance map showing good bonding in the annulus.
Figure 5B:
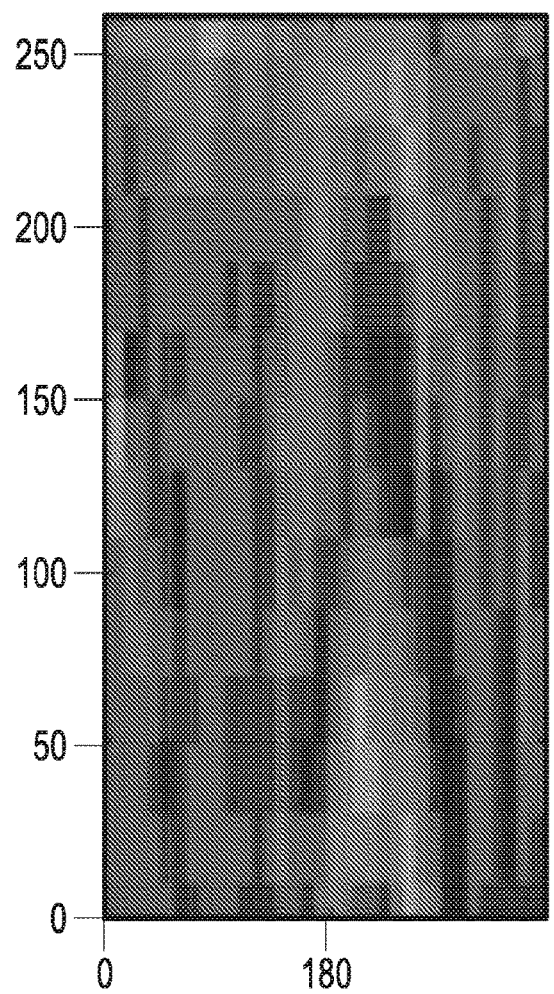

The logging procedure allowed the acoustic impedance of the annulus material to be characterized over a vertical distance of 250 mm and the entire 360° azimuthal angle. These measurements were converted into an impedance map of the annulus material, as shown by an example in FIGS. 5A and 5B for a neat cement paste hydrated with no change in casing pressure. The color coding of the map (FIG. 5A) is designed to facilitate the interpretation of the material behind the casing: cement (tan or brown), liquid (blue), or gas (red) based on their typical acoustic properties. It should be noted that low impedance values in the blue range can also indicate very weakly bonded cement. The example map (FIG. 5B) indicates good cement behind casing everywhere.

A series of two experiments using the logging apparatus of FIG. 4 was designed to test the ability of an expanding formulation to close a microannulus created by a pressure drop inside the inner casing. One experiment was conducted with neat cement, and the other with the expanding formulation. In each case the procedure was the same. The slurry was first pumped into the annulus and then the device was heated up to 30° C. While the slurry was still liquid, the casing was expanded hydraulically to the equivalent of 3000 psi [20.7 MPa]. The cement was cured for 50 h at 30° C. and, at that point, the casing pressure was removed causing the casing to contract. The logging began and continued until the set cement was 115 h old. At that point the cement was heated to 66° C. for 8 h, and then further cured at 30° C. until 139 h at which time the logging was resumed. The purpose of the 8-h heat treatment at 66° C. was to generate additional delayed expansion from the MgO present in the expanding agent; however, it was also applied to the neat cement system to provide a valid control experiment.

Figure 6B:
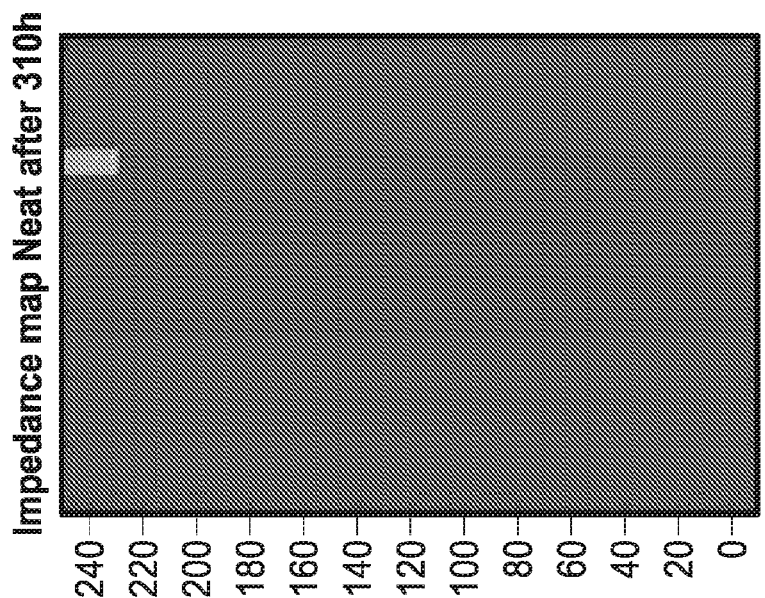
FIGS. 6A and 6B show the acoustic impedance measurements of neat cement systems after curing in the laboratory apparatus of FIG. 4.
Figure 6A:
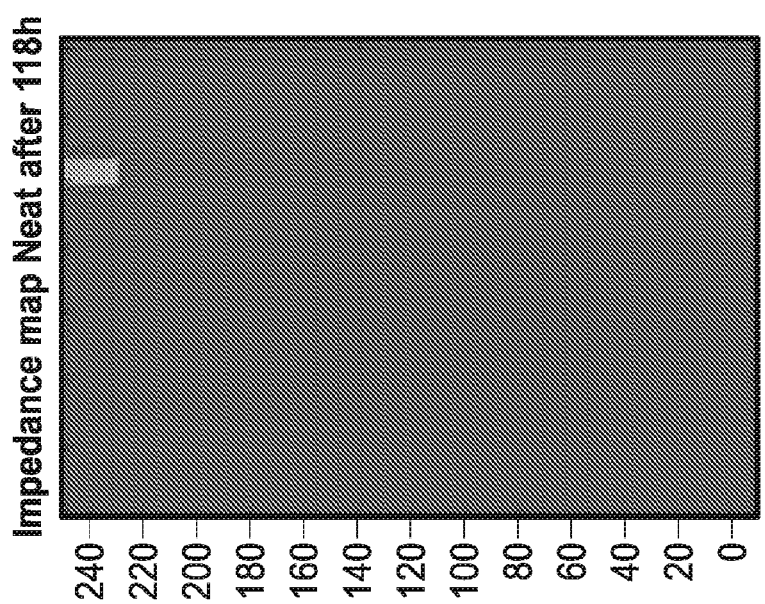

FIGS. 6A and 6B show the impedance maps from the neat cement system at 118 h (68 h after the pressure decrease) and at 310 h. Both maps show zero impedance everywhere, indicating that the pressure drop caused the cement to completely debond from the casing, creating a dry microannulus, and that the heat treatment did not induce any change.

Figure 7B:
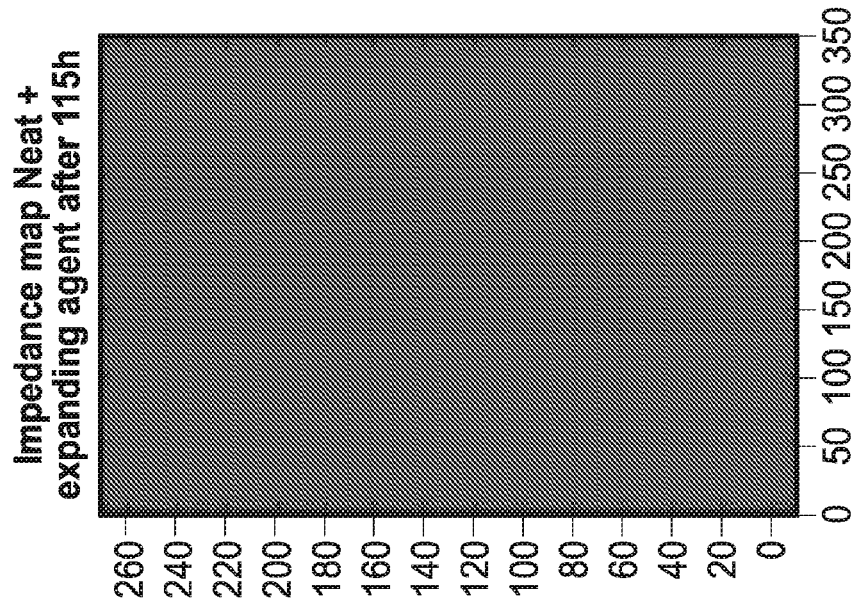
FIGS. 7A and 7B show the acoustic impedance measurements of expansive cement systems after curing in the laboratory apparatus of FIG. 4.
Figure 7A:
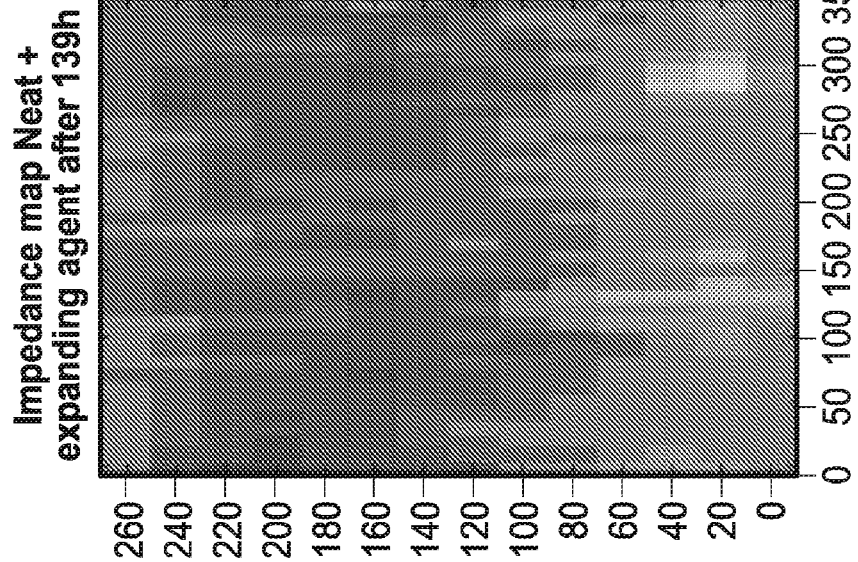

FIGS. 7A and 7B show impedance maps for the expanding formulation conducted at 115 h (65 h after the pressure decrease), and at 139 h (89 h after the pressure decrease). After the pressure decrease, the impedance map shows zero impedance everywhere, indicating a dry microannulus similar to the neat cement. However after the heat treatment, the impedance map shows good cement all around the casing, demonstrating that the expansion can help close a pre-existing microannulus and restore the acoustic coupling.

Example 3

The apparatus of Example 2 (FIG. 4) was further equipped with three strain gauges inside the inner casing and three strain gauges outside the outer casing. A series of two experiments was designed to test the ability of an expanding cement system to prevent the formation of an inner microannulus after a pressure drop inside the inner casing. One experiment was conducted with a neat cement system and the other was conducted with a pre-stressed cement containing 12% BWOC MgO/CaO expanding agent described earlier. In both cases the water-to-cement ratio was 0.41.

For both experiments, the device was first heated to 30° C. and then the slurry was poured into place. While the slurry was still liquid, the casing was expanded mechanically to the equivalent of 9 MPa. The cement was cured for 24 h at 30° C., and then heated to 85° C. for 8 h, and then further cured at 30° C. until the cement was 48 h old. At that point, the casing pressure was removed (causing the casing to contract), the apparatus was allowed to cool to 23° C., and the logging commenced. The purpose of the 8-h heat treatment at 85° C. was to generate additional pre-stress from the MgO present in the expanding agent; however, it was also applied to the neat cement system to provide a valid control experiment. The pre-stress level was measured independently at around 3.5 MPa (FIGS. 8, 9 and Table 1).

Figure 8:
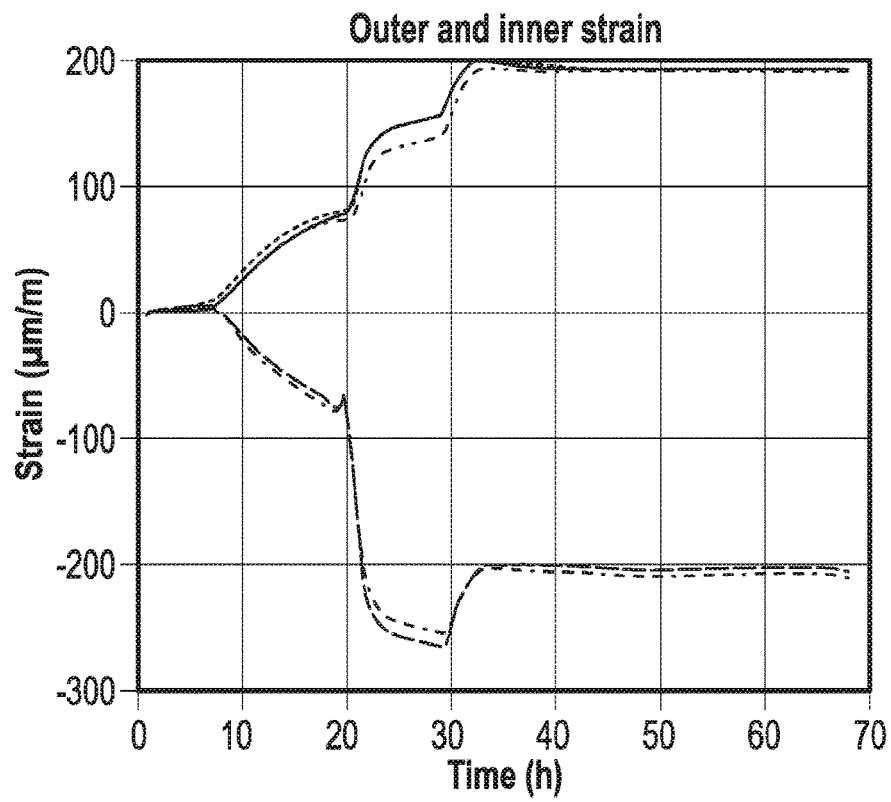
FIG. 8 shows strain measurements taken from the laboratory apparatus of FIG. 4 during the curing of an expanding cement system.
Figure 9:
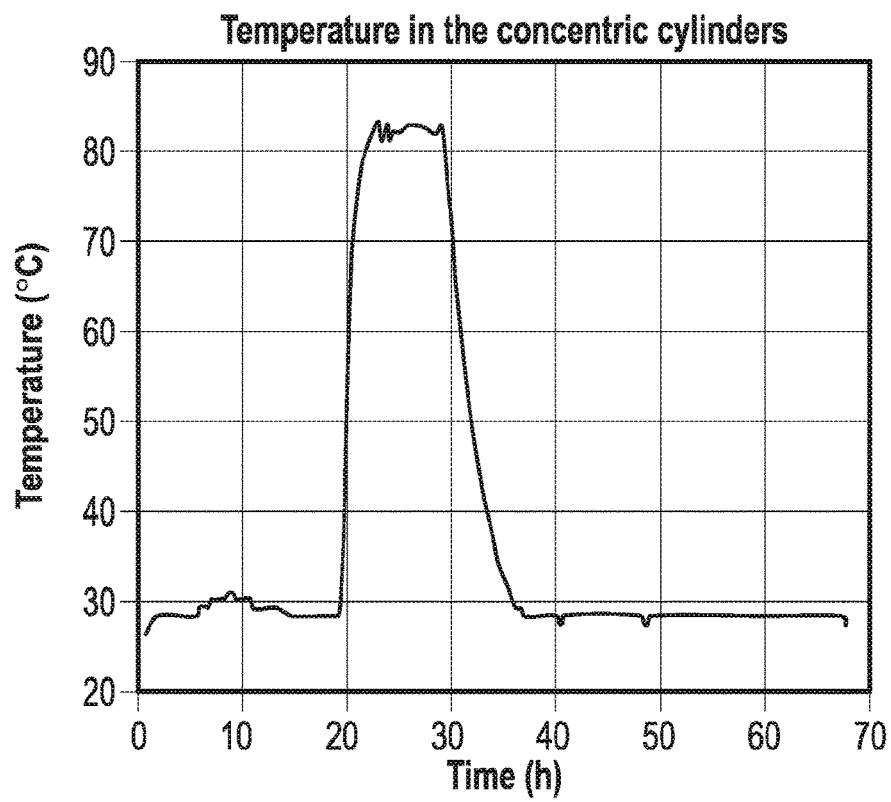
FIG. 9 shows temperature measurements taken in the annular region of the laboratory apparatus of FIG. 4 during the curing of an expanding cement system.

FIG. 8 and Table 1 present strain measurements taken from the inner and outer casings. The strain values below zero corresponded to the inner casing. Values above zero corresponded to the outer casing. The measured temperature between the concentric cylinders during the experiments is shown in FIG. 9.

TABLE 1

Measured inner and outer mean strains at different times for the expanding cement system containing 12% BWOC of MgO/CaO expanding agent.

| Time | Inner strain (μm/m) | Outer strain (μm/m) | Inner stress (MPa) | Outer stress (MPa) |
|---|---|---|---|---|
| 20 h | −80 | 80 | −1.5 | −1.5 |
| 50 h | −210 | 190 | −3.4 | −3.3 |
| 66 h | −210 | 190 | −3.4 | −3.3 |
| 382 h | −210 | 190 | −3.4 | −3.3 |

Logging experiments were conducted in the apparatus after the pressure decrease and at later times. FIGS. 10A and 10B show impedance maps measured during the experiments with the neat cement system. The map recorded at 50 h (just after the pressure drop) is shown in FIG. 10A. FIG. 10B is a map recorded 184 h following the pressure drop. The maps indicate that complete debonding of the cement sheath from the casing occurred.

Figure 11A:
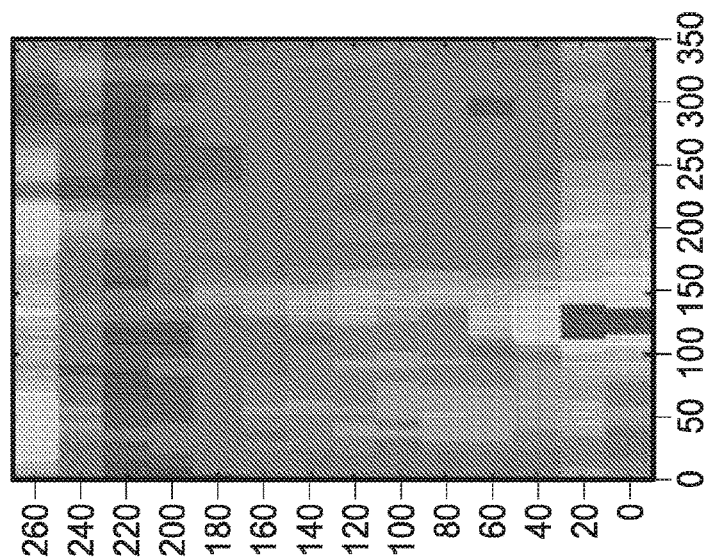
FIGS. 11A, 11B and 11C show the acoustic impedance measurement of expansive cement systems after curing in the laboratory apparatus of FIG. 4.
Figure 11B:
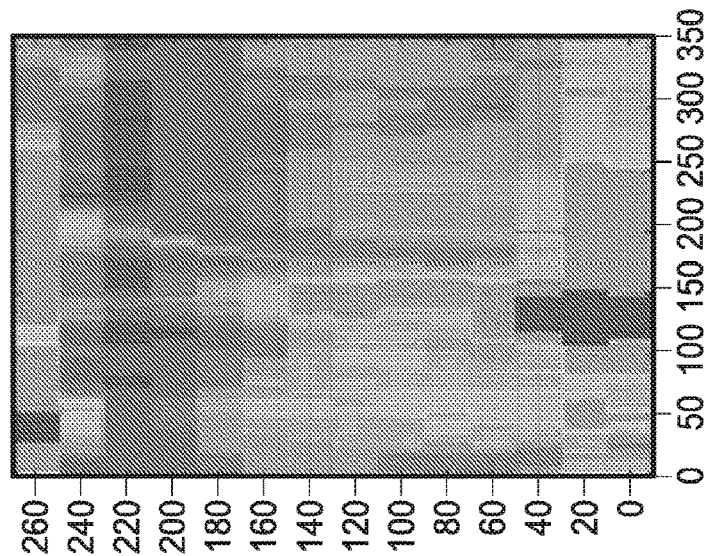
Figure 11C:
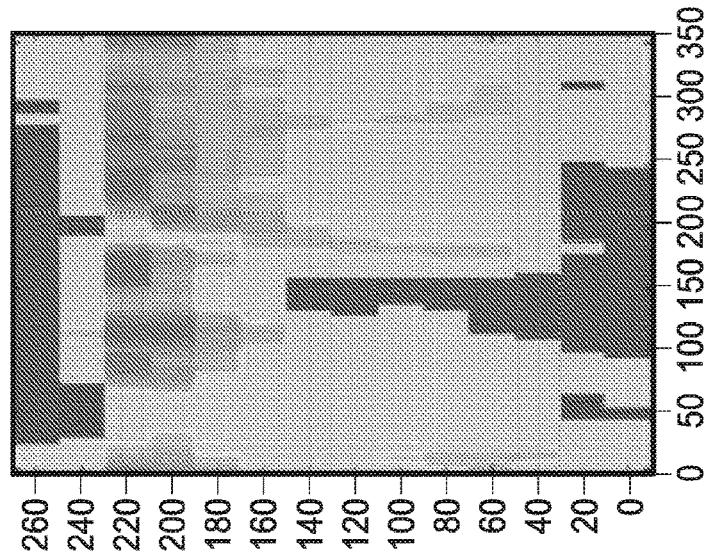

FIGS. 11A, 11B and 11C show impedance maps measured during experiments with the expanding cement system. The measurements were taken at 51 h (FIG. 11A, just after the pressure drop), at 88 h (FIG. 11B) and at 168 h (FIG. 11C). Just after the pressure drop, the impedance map was not entirely red, indicating that the cement/casing acoustic coupling was maintained at some locations. With the passage of time, the average impedance increased significantly, indicating acoustic coupling improvements.

Although various embodiments have been described with respect to enabling disclosures, it is to be understood that this document is not limited to the disclosed embodiments. Variations and modifications that would occur to one of skill in the art upon reading the specification are also within the scope of the disclosure, which is defined in the appended claims.

The invention claimed is:

1. A method, comprising:
preparing a cement slurry comprising water, portland cement and an expanding agent that comprises calcium sulfate hemihydrate, or a blend of hard-burned calcium oxide (CaO) and hard-burned magnesium oxide (MgO), or combinations thereof, wherein the expanding agent is present at a concentration between 5% and 20% by weight of cement;
placing the slurry in an annular region between a tubular body and a borehole wall or a concentric region between two tubular bodies, whereupon the slurry hardens and forms a set cement, and the expanding agent reacts and causes the set cement to be in a state of compression within the annular region;
performing a well intervention;
introducing an acoustic logging tool into the tubular body; and
without applying pressure inside the tubular body, measuring an acoustic impedance, an amplitude, an attenuation or a bond index or a combination thereof, the measurements taken azimuthally, longitudinally or both along the tubular body to determine a presence of set cement behind the tubular body or bodies in a subterranean well.

2. The method of claim 1, wherein
dimensions of the tubular body fluctuate in response to a temperature change, a pressure change, or a mechanical disturbance, or a combination thereof resulting from the well intervention.

3. The method of claim 1, further comprising:
allowing the set cement to expand and maintain the state of compression.

4. The method of claim 1, wherein the cement expansion is delayed.

5. The method of claim 1, wherein the expanding agent is encapsulated or held as an internal phase of an emulsion.

6. The method of claim 1, wherein the cement slurry further comprises fly ash, blast furnace slag, silica, diatomaceous earth, gilsonite, hematite, ilmenite, manganese tetraoxide or barite or combinations thereof.

7. A method for cementing a subterranean well having a borehole, comprising:
preparing a cement slurry comprising water, an inorganic cement and an expanding agent, wherein the expanding agent is present at a concentration between 5% and 20% by weight of cement, and the expanding agent comprises calcium sulfate hemihydrate, a blend of hard-burned calcium oxide (CaO) and hard-burned magnesium oxide (MgO), or combinations thereof;
placing the slurry in an annular region between a tubular body and a borehole wall or a concentric region between two tubular bodies, whereupon the slurry hardens and forms a set cement, and the expanding agent reacts to cause the set cement to be in a state of compression within the annular region;
performing a well intervention, during which dimensions of the tubular body or bodies fluctuate in response to a temperature change, a pressure change, a mechanical disturbance or a combination thereof, and after which the set cement expands and maintains the state of compression; and
without applying pressure within the tubular body, determining a presence of set cement behind the tubular body or bodies in a subterranean well.

8. The method of claim 7, wherein the cement expansion is delayed.

9. The method of claim 7, wherein the expanding agent is encapsulated or held as an internal phase of an emulsion.

10. The method of claim 7, wherein the cement slurry further comprises fly ash, blast furnace slag, silica, diatomaceous earth, gilsonite, hematite, ilmenite, manganese tetraoxide or barite or combinations thereof.

11. The method of claim 7, wherein the inorganic cement comprises portland cement, calcium aluminate cement, fly ash, blast furnace slag, lime/silica blends, magnesium oxychloride, geopolymers or zeolites or combinations thereof.

12. The method of claim 7, further comprising:
heating the cement slurry to about 85° C. following curing of the cement slurry.

13. A method for maintaining zonal isolation in a wellbore, comprising:
preparing a cement slurry comprising water, portland cement and an expanding agent, wherein the expanding agent is present at a concentration between 5% and 20% by weight of cement, and the expanding agent comprises calcium sulfate hemihydrate, or a blend of hard-burned calcium oxide (CaO) and hard- burned magnesium oxide (MgO), or combinations thereof;
placing the slurry in an annular region between a tubular body and a borehole wall or a concentric region between two tubular bodies, whereupon the slurry hardens and forms a set cement;
performing a well intervention, during which the dimensions of the tubular body or bodies fluctuate in response to a temperature change, a pressure change, or a mechanical disturbance or a combination thereof, and after which the expanding agent reacts and causes the set cement to expand and maintain a state of compression within the annular region; and
without applying pressure within the tubular body, determining a presence of set cement behind the tubular body or bodies in the wellbore.

14. The method of claim 13, wherein the cement expansion is delayed.

15. The method of claim 13, wherein the expanding agent is encapsulated or held as an internal phase of an emulsion.

16. The method of claim 13, wherein the cement slurry further comprises silica, diatomaceous earth, gilsonite, hematite, ilmenite, manganese tetraoxide, barite, glass or ceramic microspheres or combinations thereof.

17. The method of claim 1, further comprising:
heating the cement slurry to about 85° C. following curing of the cement slurry.

18. The method of claim 13, further comprising:
heating the cement slurry to about 85° C. following curing of the cement slurry.

* * * * *